United States Patent
Cunningham et al.

(10) Patent No.: US 8,255,142 B2
(45) Date of Patent: Aug. 28, 2012

(54) ENHANCED POWERTRAIN PERFORMANCE DURING KNOCK CONTROL

(75) Inventors: Ralph Wayne Cunningham, Milan, MI (US); Michael Howard Shelby, Dearborn Heights, MI (US); Tobias John Pallett, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

(21) Appl. No.: 12/408,494

(22) Filed: Mar. 20, 2009

(65) Prior Publication Data

US 2010/0241323 A1    Sep. 23, 2010

(51) Int. Cl.
*G06F 7/00* (2006.01)
(52) U.S. Cl. ............ 701/111; 701/54; 701/55; 701/105
(58) Field of Classification Search .......... None
See application file for complete search history.

(56) References Cited

U.S. PATENT DOCUMENTS

| | | | |
|---|---|---|---|
| 5,669,347 A * | 9/1997 | Cullen et al. | 123/306 |
| 6,269,293 B1 * | 7/2001 | Correa et al. | 701/51 |
| 6,510,834 B1 | 1/2003 | Tomita et al. | |
| 7,152,560 B2 | 12/2006 | Miyanoo et al. | |
| 7,469,180 B2 * | 12/2008 | Yasui et al. | 701/105 |
| 2007/0215106 A1 * | 9/2007 | Petridis et al. | 123/347 |
| 2009/0055078 A1 * | 2/2009 | Chen et al. | 701/103 |
| 2009/0118963 A1 * | 5/2009 | Heap | 701/99 |
| 2010/0037859 A1 * | 2/2010 | Mashiki | 123/406.33 |

FOREIGN PATENT DOCUMENTS

WO   2008/029212   3/2008

* cited by examiner

*Primary Examiner* — Khoi Tran
*Assistant Examiner* — Bao Long T Nguyen
(74) *Attorney, Agent, or Firm* — Julia Voutyras; Alleman Hall McCoy Russell & Tuttle LLP

(57) ABSTRACT

Various systems and methods are described for controlling combustion stability in an engine driving a transmission. One example method comprises limiting airflow to the engine in response to a spark timing retarded beyond a spark retard threshold, the limiting airflow to the engine reducing engine torque output and compensating for the reduction in engine torque output by adjusting a transmission operating parameter.

15 Claims, 7 Drawing Sheets

ENHANCED POWERTRAIN PERFORMANCE DURING KNOCK CONTROL

FIELD

The present description relates to a method for controlling an internal combustion engine to mitigate performance degradation resulting from knock controls.

BACKGROUND AND SUMMARY

Vehicle engine knock controls may retard spark timing relative to MBT (Minimum spark advance for Best Torque) in response to knock in order to abate the knock. However, drastically retarded spark timing may lead to unstable combustion without mitigating knock, for example at high IMEP (indicated mean effective pressure) and low engine speeds (e.g., less than 2000 rpm). Such conditions may be present in a direct injection engine including a boost system, such as a turbocharger, and may be exacerbated by high engine temperatures and/or using a low octane fuel.

One approach for controlling combustion instability during such knock control is described in WO 2008/029212. An amount of intake air is limited as a knock compensation value is large to a retarded side or as an intake air temperature value is high.

However, the inventors herein have recognized a problem with performance degradation resulting from such an approach. Specifically, as intake air is limited, engine output torque may correspondingly be reduced, thus reducing wheel torque to less than that desired by the driver. Furthermore, sudden transitions into and out automated control of the engine's intake air may result in further performance issues such as, for example, vehicle jerking.

Accordingly, methods are provided for controlling combustion stability in an engine driving a transmission. One example method comprises limiting airflow to the engine in response to a spark timing retarded beyond a spark retard threshold, the limiting airflow to the engine reducing engine torque output and compensating for the reduction in engine torque output by adjusting a transmission operating parameter.

In this way, it is possible to mitigate the effects of knock during high boost pressure and low engine speed conditions. Further, it is also possible to apply the above example method in combination with ramping in and ramping out automatic control of airflow to the engine as well as compensating for torque loss by changing transmission scheduling to mitigate vehicle performance degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
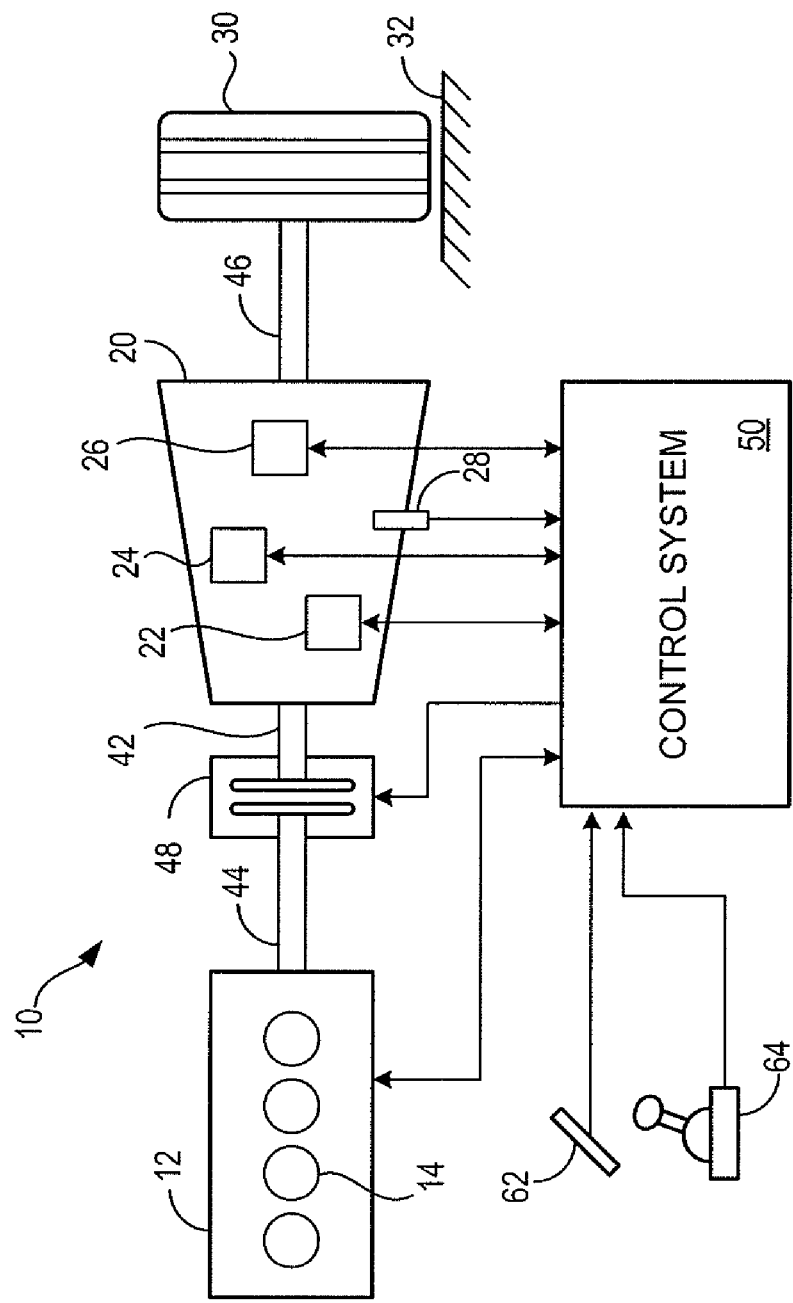
FIG. 1 shows an example embodiment of a powertrain comprising an engine and transmission.
Figure 2:
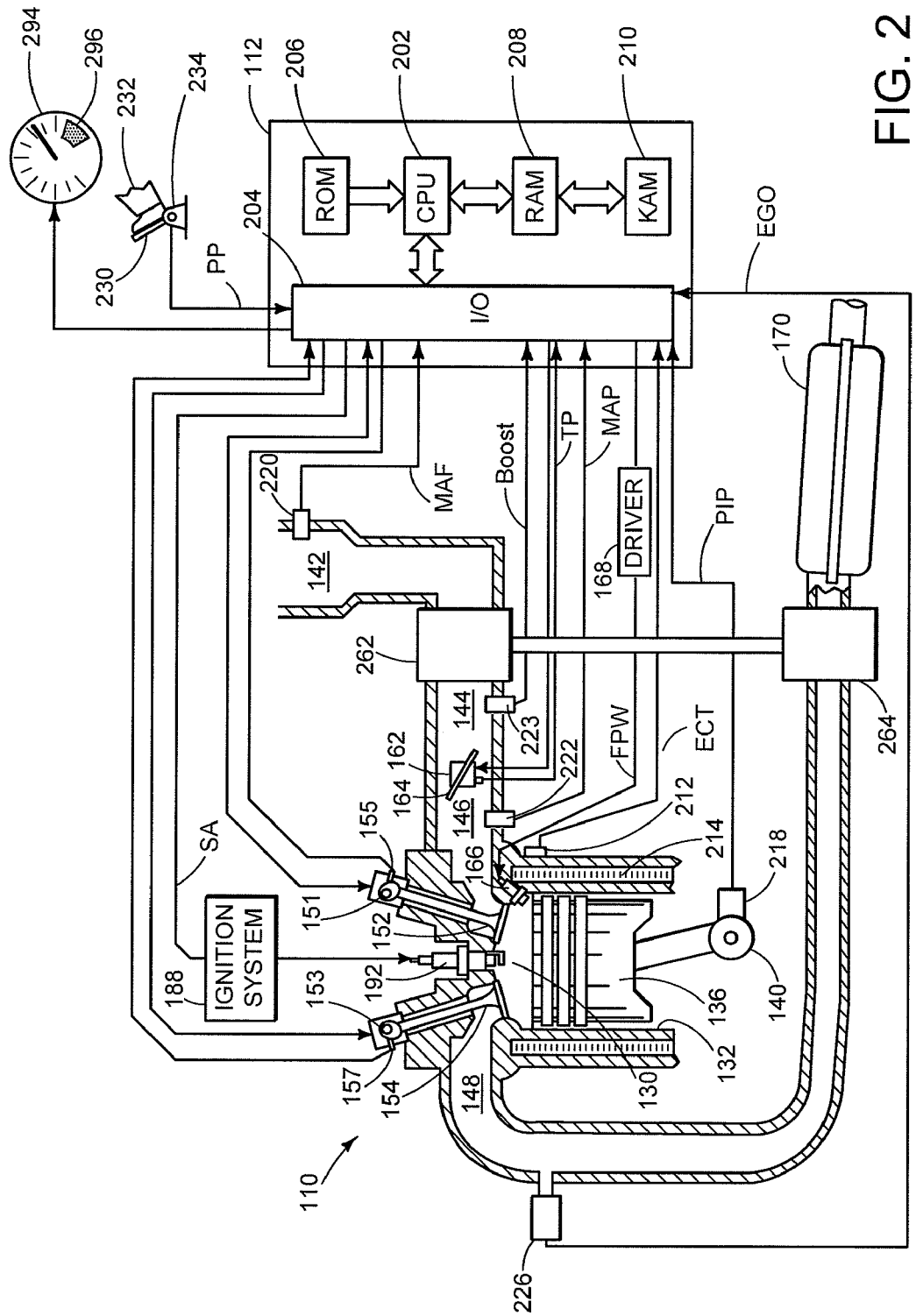
FIG. 2 shows an example embodiment of the engine.
Figure 3:
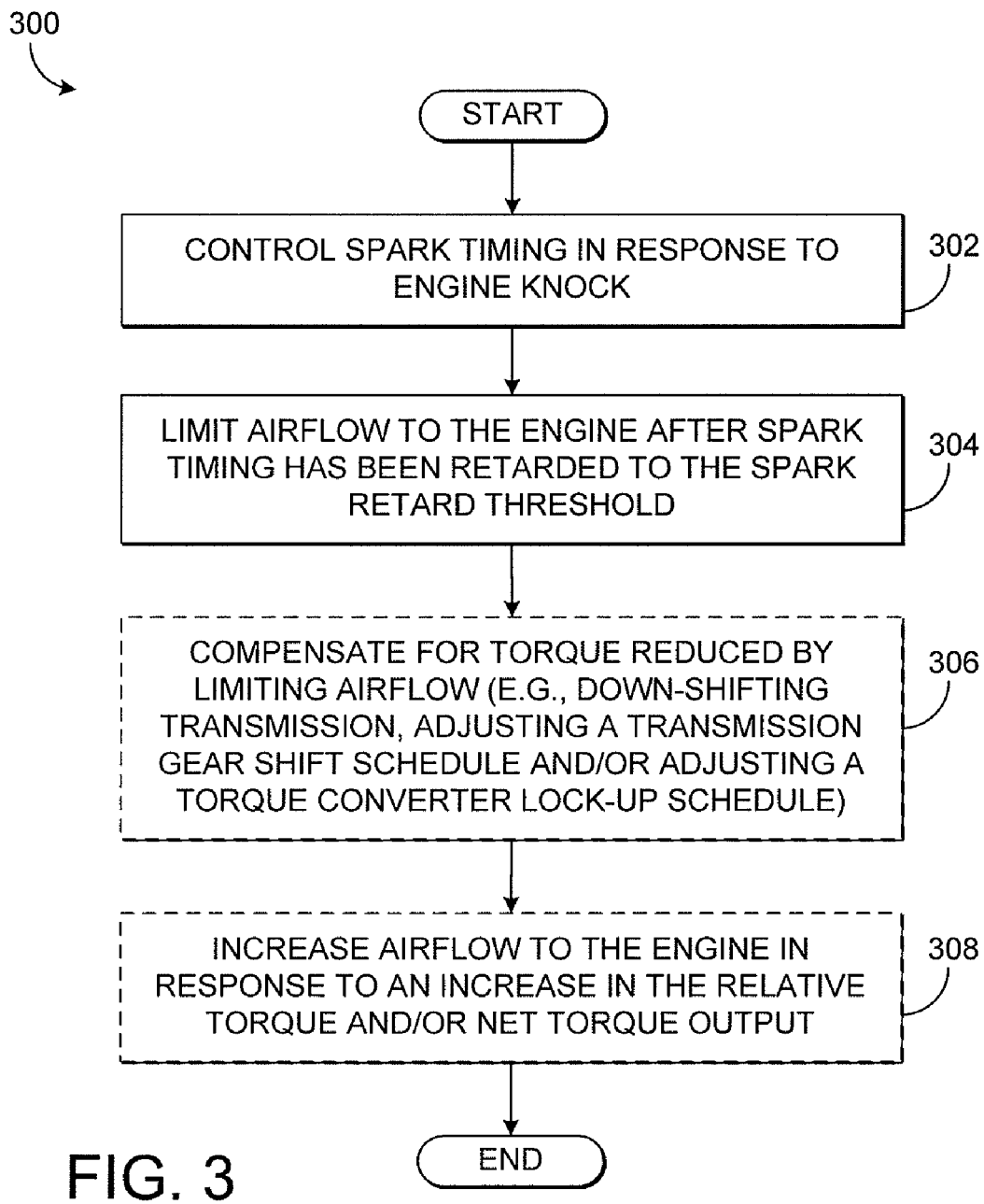
FIG. 3 is a high level flow chart illustrating an example method for controlling an internal combustion engine to mitigate performance degradation resulting from knock control.
Figure 4:
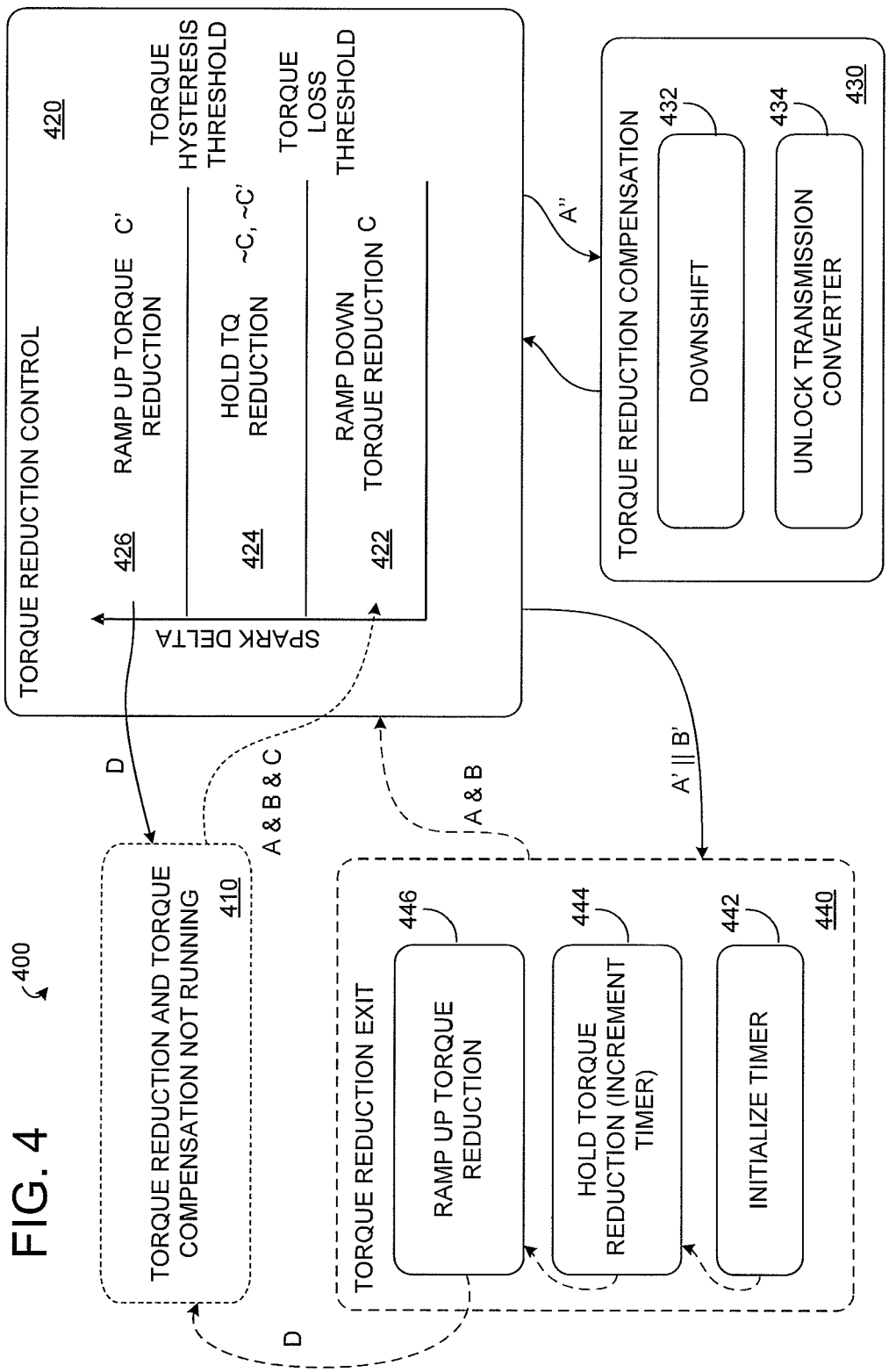
FIG. 4 is a state diagram for mitigating performance degradation resulting from knock control.
Figure 5:
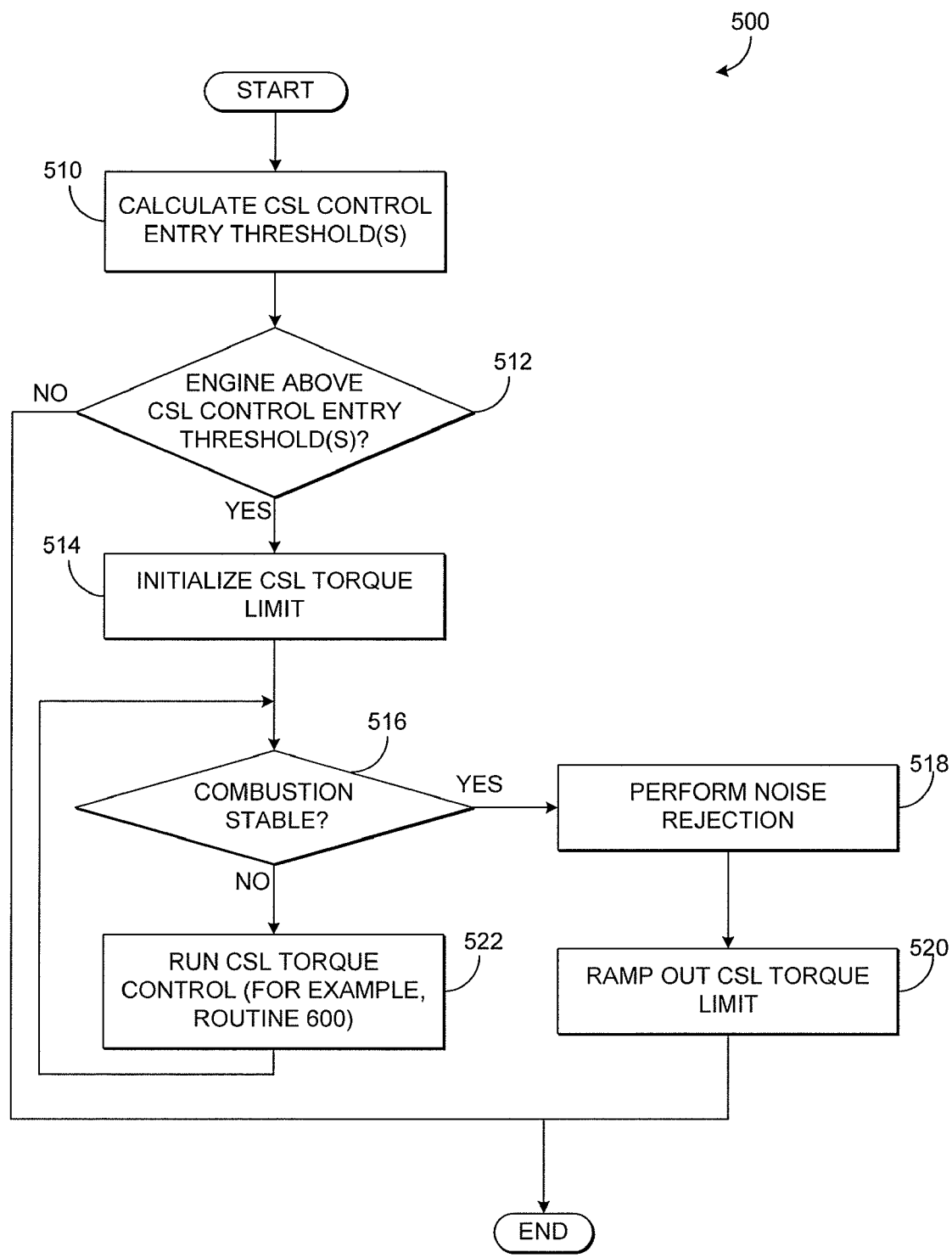
FIG. 5 is a flow chart illustrating an example routine for controlling combustion stability in the engine.
Figure 6:
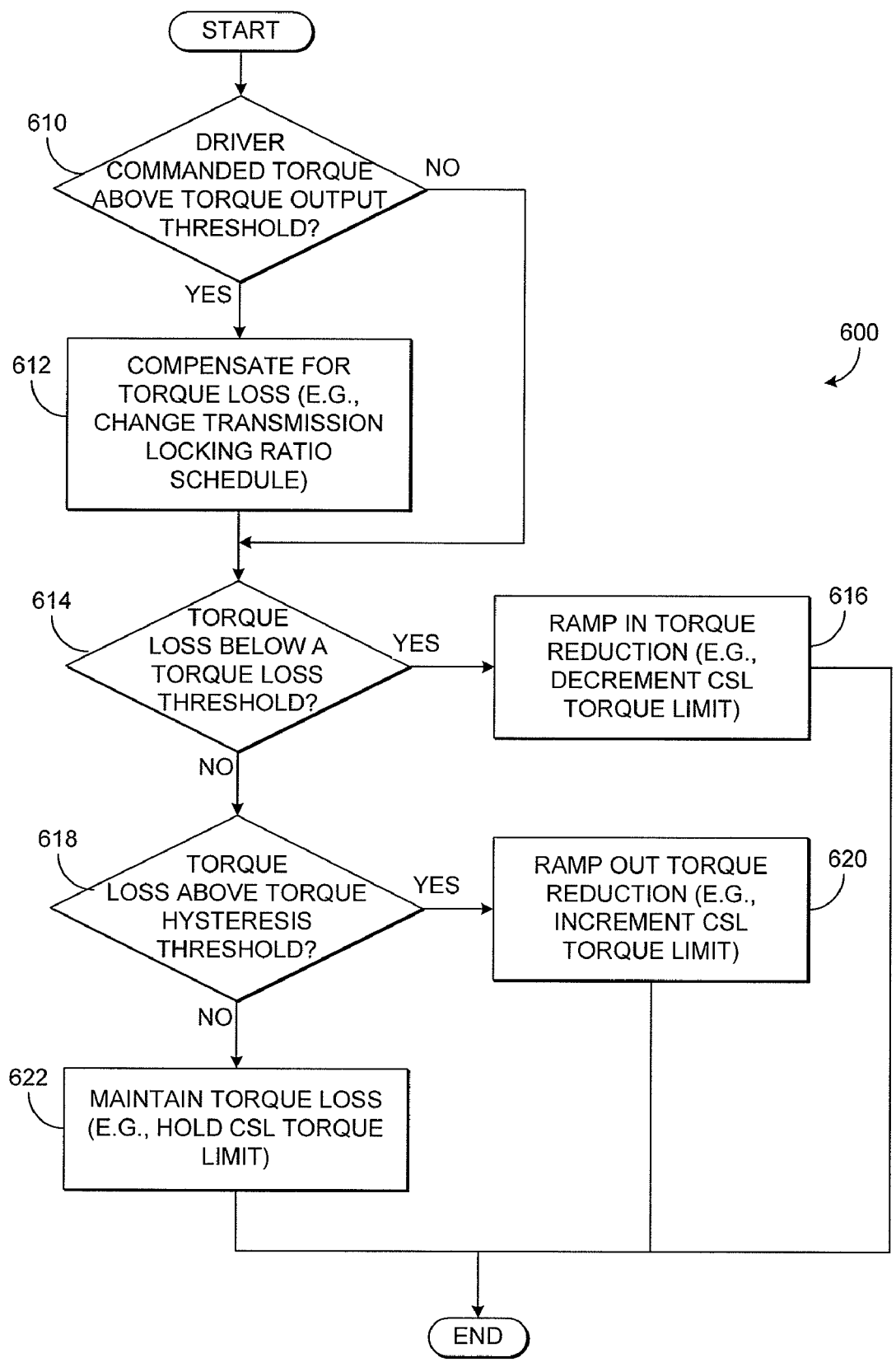
FIG. 6 is a flow chart illustrating an additional example routine for controlling combustion stability in the engine.
Figure 7:
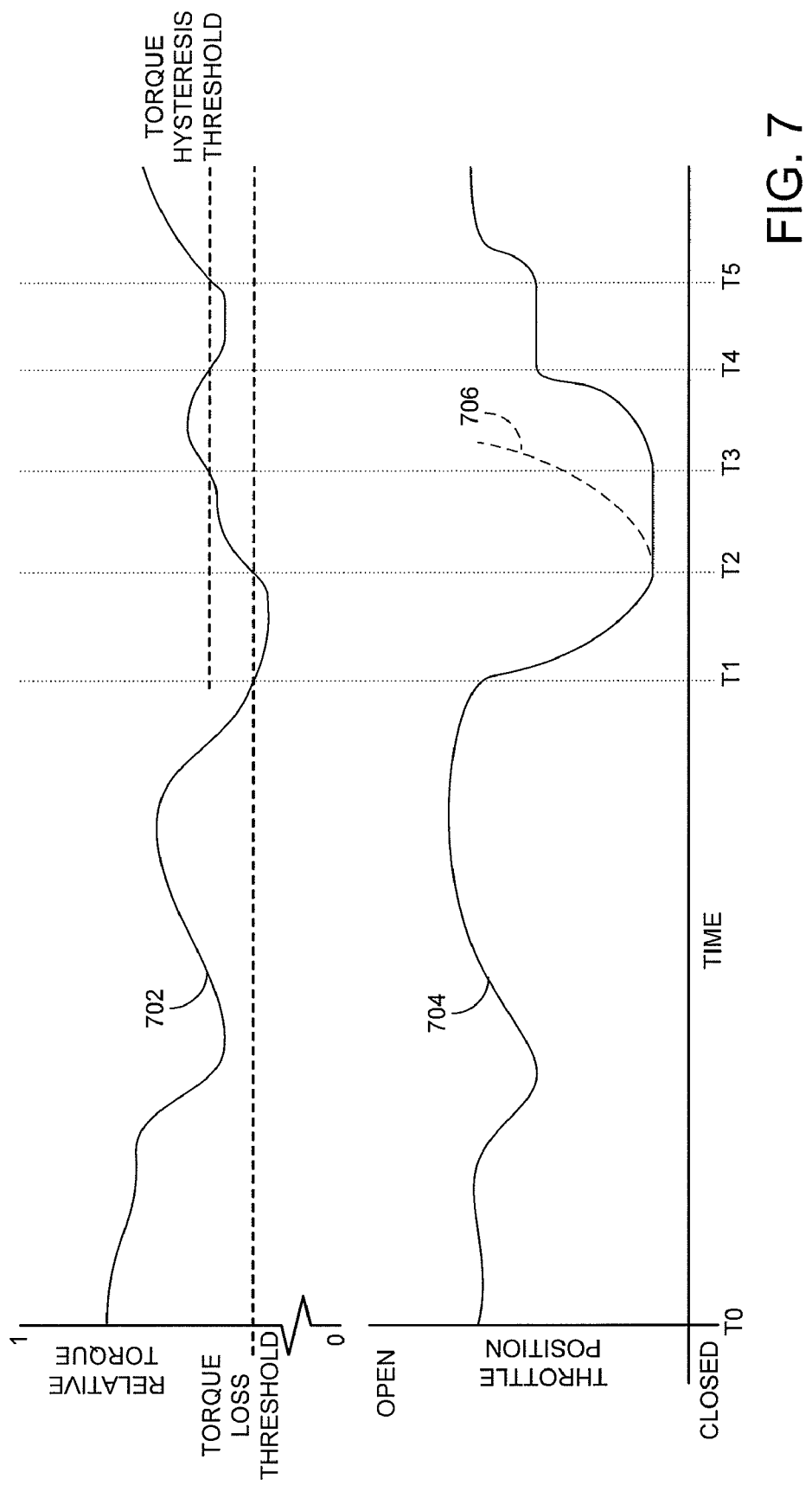
FIG. 7 is a timing chart illustrating example operation according to the example routines described in FIGS. 5 and 6 on an engine during knock control and spark retard.

A vehicle powertrain, such as illustrated in FIG. 1 may experience a variety of operation conditions, some of which may result in the engine, such as in FIG. 2, experience phenomena referred to as engine knock. The powertrain control system may utilize feedback control of spark timing in response to indications of the knock, as well as other measures to maintain vehicle performance, such as illustrated in FIG. 3. In one example, in response to engine knock, the control system may retard spark timing to abate the knock. However, after a significant amount of spark timing retard, engine combustion may become degraded below a threshold acceptable level. As such, airflow may be limited to reduce the combustion stability degradation. In turn, adjustments to other powertrain components, such as the transmission and/or torque converter may be provided to further compensate for the airflow limiting and thereby maintain acceptable vehicle driveability. In one particular example, the airflow limiting may be ramped in and out based on various operating conditions to maintain acceptable vehicle performance, while still addressing the issues of knock and combustion stability. Additional example embodiments are illustrated in FIGS. 4-6, while FIG. 7 shows an example graph illustrating performance over time, and the various interventions that may occur.

FIG. 1 is a schematic depiction of an example vehicle powertrain 10 comprising an internal combustion engine 12, transmission 20, and at least one driven wheel 30 communicating with a ground surface 32. Powertrain 10 may be included in a propulsion system of a vehicle. Engine 12 includes one or more combustion chambers or cylinders indicated at 14. A mechanical output of engine 12 can be provided via a crankshaft 44. The powertrain 10 may comprise a hybrid powertrain, where an electrically powered drive motor is included.

Transmission 20 includes an input shaft 42 coupled with crankshaft 44 of engine 12 via a torque converter 48. Torque converter 48 may include a lock-up clutch for partly or fully locking-up the torque convert. Transmission 20 also includes an output shaft 46 coupled with drive wheel 30. Thus, a mechanical output provided by engine 12 can be delivered to drive wheel 30 via transmission 20 and/or torque converter 48.

In some embodiments, transmission 20 may be configured as a continuously variable transmission (CVT), whereby the gear ratio of the transmission may be increased or decreased continuously across a gear ratio range. In other embodiments, transmission 20 may include a plurality of discrete gear ratios. For example, the gear ratio of the transmission 20 may be adjusted by shifting the transmission between two or more of the discrete gear ratios.

Transmission 20 can include one or more actuators for controlling the engagement and disengagement of various transmission elements to effect gear changes. Some of these actuators are shown schematically at 22, 24 and 26. As one non-limiting example, some of these actuators may be configured as hydraulic actuators for engaging or disengaging one or more clutches of the transmission. In some examples, transmission 20 may also include a temperature sensor indicated at 28, which can provide an indication of transmission temperature to control system 50. However, in some examples, temperature sensor 28 may be omitted from transmission 20.

Powertrain 10 also includes a control system 50, configured to receive signals, for example from the transmission actuators, 22, 24, and 26, engine 12, temperature sensor 28 and torque converter lock-up clutch. Further, control system 50 may be configured to control the powertrain 10 in response to transmission operating parameters and engine operating parameters. For example, control system 50 can adjust the engine 12, lock-up state of torque converter 48, and/or the selected gear ratio of transmission 20 in response to input received from user input devices 62 and 64. Additional details of adjusting the transmission gear ratio and torque converter lock-up clutch are discussed in more detail below, with reference to FIG. 3.

FIG. 2 is a schematic diagram showing one cylinder of multi-cylinder engine 110, which is one example of engine 12 described above with reference to FIG. 1. Engine 110 may be controlled at least partially by the control system including controller 112 and by input from a vehicle operator 232 via an example input device 230. In this example, input device 230 includes an accelerator pedal and a pedal position sensor 234 for generating a proportional pedal position signal PP. Combustion chamber (i.e., cylinder) 130 of engine 110 may include combustion chamber walls 132 with piston 136 positioned therein. Piston 136 may be coupled to example crankshaft 140 so that reciprocating motion of the piston is translated into rotational motion of the crankshaft. Crankshaft 140 may be coupled to at least one drive wheel of a vehicle via an intermediate transmission system (as shown above in FIG. 1). Further, a starter motor may be coupled to crankshaft 140 via a flywheel to enable a starting operation of engine 110.

Combustion chamber 130 may receive intake air from intake manifold 146 via intake passage 142 and may exhaust combustion gases via exhaust passage 148. Intake manifold 146 and exhaust passage 148 can selectively communicate with combustion chamber 130 via respective intake valve 152 and exhaust valve 154. In some embodiments, combustion chamber 130 may include two or more intake valves and/or two or more exhaust valves.

In this example, intake valve 152 and exhaust valves 154 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 112 to vary valve operation. The position of intake valve 152 and exhaust valve 154 may be determined by position sensors 155 and 157, respectively. In alternative embodiments, intake valve 152 and/or exhaust valve 154 may be controlled by electric valve actuation. For example, cylinder 130 may alternatively include an intake valve controlled via electric valve actuation and an exhaust valve controlled via cam actuation including CPS and/or VCT systems.

Fuel injector 166 is shown coupled directly to combustion chamber 130 for injecting fuel directly therein in proportion to the pulse width of signal FPW received from controller 112 via electronic driver 168. In this manner, fuel injector 166 provides what is known as direct injection of fuel into combustion chamber 130. The fuel injector may be mounted in the side of the combustion chamber or in the top of the combustion chamber, for example. Fuel may be delivered to fuel injector 166 by a fuel system (not shown) including a fuel tank, a fuel pump, and a fuel rail. In some embodiments, combustion chamber 130 may alternatively or additionally include a fuel injector arranged in intake passage 146 in a configuration that provides what is known as port injection of fuel into the intake port upstream of combustion chamber 130.

Intake passage 142 may include an example throttle 162 having a throttle plate 164. In this particular example, the position of throttle plate 164 may be varied by controller 112 via a signal provided to an electric motor or actuator included with throttle 162, a configuration that is commonly referred to as electronic throttle control (ETC). In this manner, throttle 162 may be operated to vary the intake air provided to combustion chamber 130 among other engine cylinders. The position of throttle plate 64 may be provided to controller 112 by throttle position signal TP. Intake passage 142 may include a mass air flow sensor 220 and a manifold air pressure sensor 222 for providing respective signals MAF and MAP to controller 112.

Ignition system 188 can provide an ignition spark to combustion chamber 130 via spark plug 192 in response to spark advance signal SA from controller 112, under select operating modes. Though spark ignition components are shown, in some embodiments, combustion chamber 130 or one or more other combustion chambers of engine 110 may be operated in a compression ignition mode, with or without an ignition spark.

Exhaust gas sensor 226 is shown coupled to exhaust passage 148 upstream of emission control device 170. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 170 is shown arranged along exhaust passage 148 downstream of exhaust gas sensor 226. Device 170 may be a three way catalyst (TWC), NOx trap, various other emission control devices, or combinations thereof. In some embodiments, during operation of engine 110, emission control device 170 may be periodically reset by operating at least one cylinder of the engine within a particular air/fuel ratio.

Controller 112 is shown in FIG. 1 as a microcomputer, including microprocessor unit 202, input/output ports 204, an electronic storage medium for executable programs and calibration values shown as read only memory chip 206 in this particular example, random access memory 208, keep alive memory 210, and a data bus. Controller 112 may be referred to as an engine control unit (ECU). Storage medium read-only memory 206 can be programmed with computer readable data representing instructions executable by processor 202 for performing the methods described below as well as other variants that are anticipated but not specifically listed. In some examples, controller 112 is included in control system 50, as described above with reference to FIG. 1.

Controller 112 may receive various signals from sensors coupled to engine 110, in addition to those signals previously discussed, including measurement of inducted mass air flow (MAF) from mass air flow sensor 220; engine coolant temperature (ECT) from temperature sensor 212 coupled to cooling sleeve 214; a profile ignition pickup signal (PIP) from Hall effect sensor 218 (or other type) coupled to crankshaft 140; throttle position (TP) from a throttle position sensor; and absolute manifold pressure signal, MAP, from sensor 222. Engine speed signal, RPM, may be generated by controller 112 from signal PIP. A tachometer 294 may be used to display the engine RPM generated by controller 112 to the vehicle operator. The tachometer may include a red-line range 296 indicating a maximum engine operating speed. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

Engine 110 may further include a compression device such as a turbocharger or supercharger including at least a compressor 262 arranged along intake manifold 144. For a turbocharger, compressor 262 may be at least partially driven by a turbine 264 (e.g. via a shaft) arranged along exhaust passage 148. For a supercharger, compressor 262 may be at least partially driven by the engine and/or an electric machine, and may not include a turbine. Thus, the amount of compression provided to one or more cylinders of the engine via a turbocharger or supercharger may be varied by controller 112.

As described above, FIG. 1 shows only one cylinder of a multi-cylinder engine, and that each cylinder may similarly include its own set of intake/exhaust valves, fuel injector, spark plug, etc.

FIG. 3 is a higher level flow chart illustrating an example method 300 for controlling a powertrain of a vehicle, such as powertrain 10, to mitigate performance degradation resulting from knock control while addressing combustion stability.

First at 302, the method includes controlling spark timing in response to engine knock. In one example, spark timing is retarded from MBT based on feedback of engine knock. The routine continues to retard spark timing in response to knock feedback, up to a spark retard threshold. The spark retard threshold may be a spark borderline, such that retarding spark timing beyond the spark retard threshold may degrade combustion stability within one or more cylinders of the engine beyond an acceptable level. In one example, the spark retard threshold is based on relative torque reduction due to the retarded spark timing. In this example, the relative torque reduction is determined based on a ratio of the engine torque at the current (retarded) spark timing to the engine torque at MBT timing, for the current operating conditions. In another example, the relative torque reduction may be determined based on a difference in the current (retarded) spark timing from MBT timing (spark delta). Spark delta is one example of a relative spark ratio measurement of torque loss. Further, the spark retard threshold may be adjusted with a sensed MAP value or a commanded torque value, in addition to, or instead of spark delta.

Alternatively, the spark retard threshold (as well as the spark borderline) may be determined by another suitable method, such as for example, based on a base engine coolant temperature reaching a threshold, a foreground borderline calculation, a background borderline calculation and the like. Further, in some examples, the spark retard threshold may include an additional buffer amount to account for estimation errors. Further still, various suitable methods for determining when the co-efficient of variance (COV) of indicated mean effective pressure (IMEP) is above 3% and/or when 50% of a charge's heat is released during combustion at a crank angle of 30 degrees after top dead center (ATDC) may be used to determine combustion stability such as high manifold absolute pressure and high engine torque command.

Knock may be identified in various ways, including via a knock sensing device such as a knock detection circuit integrated within an example ignition system, and/or a signal from an engine block accelerometer. Further, in some examples, knock may be anticipated based on engine conditions such as engine coolant temperature, engine speed, manifold pressure, etc.

After 302, the method continues to 304 to limit airflow to the engine after spark timing has been retarded to the spark retard threshold. As such once feedback knock control results in spark retard to the spark retard threshold, airflow to the engine is limited, particularly if knock feedback persists. Thus, rather than further retarding spark timing to abate knock, airflow is limited thereby reducing airflow entering one or more cylinders which are knocking. Various approaches may be provided for limiting airflow, including increased throttling, reduced boost, adjusted intake/exhaust valve timing/lift, (e.g., reducing a valve lift, changing a valve timing (either retarding or advancing), and/or decreasing a valve duration), and/or combinations thereof.

In one example, the limiting of airflow may be ramped in over a duration, such as over time or over a number of engine combustion events. The rate of limiting may be based on spark delta, MAP pressure, PP signal, commanded torque, engine temperature, engine load, engine speed, fuel octane level and the like. In operating conditions where knock is more prevalent (e.g., high load, low engine speed, high engine temperature and low octane fuel), airflow may be ramped out more quickly. Similarly, when comparing two spark delta values, the lower of the two may trigger a faster rate of limiting.

Next, at 306, as indicated by the dashed box, the routine optionally compensates for torque reduced by limiting airflow, depending on conditions such as demanded performance from the engine, the level of torque loss caused by the limiting of airflow, and the like. In examples where the method 300 does not include compensating at 306, the method may continue on to 308 or may end.

The compensation of 306 may comprise adjusting a transmission and/or torque converter operation of the powertrain. In one example, the routine provides a transmission gear shift in response to the operator's reaction to the limiting of airflow. Specifically, the control system may identify a request to increase the torque (e.g., increase in commanded torque) delivered to the drive wheels of the vehicle due to the decrease in powertrain output caused by the spark retard and airflow limiting (e.g., via signal PP increasing). The control system may then perform a down-shift of the transmission (to increase the gear ratio). By down-shifting the transmission (e.g. increasing the gear ratio) the speed of the engine may be increased through the increased gear ratio, which then moves the engine to a new operating range in which knock limits are decreased, enabling operation of the spark timing away from (e.g., advanced) from the spark retard threshold.

In another example, the routine may adjust a transmission schedule, such as a torque converter locking ratio schedule, and a transmission gear shift schedule. The transmission schedules comprise set points, such as a shifting point and/or lock/unlock points. Such set points may be thresholds compared to one or more of the vehicle's speed, commanded torque, torque output, and example PP signals. The torque converter locking state and the gear ratio in the transmission are adjusted according whether the vehicle operates above or below a given set point. For example, a driver may increase the position of the accelerator pedal (accelerator pedal), and thereby increase the PP signal beyond a pedal position threshold. Under nominal engine conditions, the associated increase in commanded torque may cause earlier torque converter unlock and later gear shift with respect to vehicle speed, increasing multiplication across the converter and providing a gear ratio that outputs the commanded torque. In additional examples, the shift schedule may be adjusted to correspond with locking and unlocking of the torque converter so that the transition in and out of torque converter lockup may be carried out smoother and/or torque converter lockup may be extended for a longer period. In further approaches the transmission and torque converter may be adjusted independently of each other based on different operating conditions.

Continuing with FIG. 3, compensation at 306 may include adjusting the torque converter locking schedule and/or the transmission gear shift schedule by changing the value of one or more set points such as a shift point, a lock-up point or an unlock point. Changing the value of the set point may include lowering a threshold vehicle speed, torque and/or pedal position that triggers a downshift from a higher gear to a lower gear or an un-lock of the torque converter. In such an example, a downshift in the transmission and/or un-lock of the torque converter may occur at lower pedal positions and/or vehicle speeds, thereby enabling compensation for the limitation of airflow, as well as moving the engine operation to a less knock-limited condition.

Finally at 308, the method 300 includes increasing airflow to the engine in response to an increase in the relative torque and/or net torque output. For example, once the engine operating conditions change such that the relative torque due to the spark retard increases to a threshold, this indicates that the limits of engine knock have reduced, and limiting of the engine airflow may be reduced. In one particular example, the limiting of airflow may be ramped out over a duration, such as a time or a number of engine combustion events.

In one example, the routine may determine whether to ramp out the limiting of airflow (e.g., increase airflow) depending on, for example, the rate of increase in net torque output from the engine. Ramping out the limiting of airflow may comprise opening the throttle, increasing intake valve opening and/or duration, advancing or retarding intake valve timing, increasing boost, and/or combinations thereof.

By ramping in and out the limiting of airflow (either discretely or continuously), according to engine performance, it is possible to provide improved knock abatement and reduced impact on vehicle performance. Further, by compensating for the torque loss (due to the spark retard and airflow limiting) via torque converter adjustment and/or transmission gear ratio adjustment, vehicle responsiveness during airflow limiting knock control is improved. Additional examples and details of routines and control states related to method 300 will be discussed below, with reference to FIGS. 4 through 7.

FIG. 4 shows a state diagram for mitigating performance degradation resulting from knock control. A powertrain state diagram 400 comprises various control states, for example an off state 410 (where torque reduction and torque compensation are not running), a torque reduction control state 420, a torque reduction compensation state 430, and a torque reduction exit state 440. The operations illustrated by the state diagram 400 may be implemented in controller 112, or control system 50, discussed above in FIGS. 1 and 2.

The states operate based on various engine operating parameters, or transmission operating parameters, including commanded torque, intake manifold air pressure (MAP), spark delta, torque output, and time. Further, constants, thresholds and limits, such as a torque output limit, may be used in comparison to operating parameters conditions to determine which of states 410, 420, 430, and 440 operate. In the present example, conditions A, A', A", B, B', C, C' and D (as shown in Table 1 below) relate parameters, for example, thresholds and limits, and determine which control state(s) are active. In the present example, condition A" may be equivalent to decreasing an example shift point by 4 degrees of the pedal position. In additional examples, condition A" may be replaced with a condition dependent upon PP signals.

TABLE 1

(Engine operating conditions):

| Condition | Example Associated Inequality | Example Threshold value |
|---|---|---|
| A | commanded torque > commanded torque threshold | commanded torque threshold = 339 N · m |
| A' | commanded torque < commanded torque hysteresis threshold | commanded torque hysteresis threshold = 305 N · m |
| A" | commanded torque > torque output threshold | torque output threshold = 400 Newton meters |
| B | MAP > manifold pressure threshold | Manifold pressure threshold = 29.9 in-Hg |
| B' | MAP < manifold pressure hysteresis threshold | Manifold pressure hysteresis threshold = 29.89 in-Hg |
| C | Spark delta < torque loss threshold | torque loss threshold = 85% |
| C' | Spark delta > torque hysteresis threshold | torque hysteresis threshold = 86% |
| D | Torque output limit > stability threshold | Stability threshold = 1600 N · m |
| E | Time > time limit | Time limit = 1 s |

During operation, if conditions A, B and C are all met (e.g., a powertrain state such that A & B & C is present, where the ampersand "&" denotes logical conjunction, also known as "logical and"), the powertrain control system operates the torque reduction control state 420. During operation, state 420 may limit airflow to the engine via at least one of an example throttle, intake valve and boost device. Airflow may be controlled so that the torque does not rise above the torque output limit. The state 420 may discretely increment or decrement the torque output limit. For example, if the spark delta is below the torque loss threshold, the control state 420 may decrement the torque output limit at 422. Further, the torque loss threshold may be an example spark retard threshold. By decreasing the limit one or more times, the state may ramp in airflow limiting (and thus torque reduction). Additionally, if the spark delta is above the torque hysteresis threshold, the state 420 may increment the torque output limit at 426. By increasing the limit one or more times, the state may ramp out the airflow limiting (and thus torque reduction). Further, if the spark delta is neither below the torque loss threshold nor above the torque hysteresis threshold, the torque output limit may be maintained at 424.

If condition A" is met, the control system may operate the torque reduction compensation state 430. Torque reduction compensation state 430 may be run either in series or in parallel with the torque reduction control state 420. State 430 is one example of a torque reduction compensation, and includes carrying out downshifting at 432 from a higher gear to a lower gear. In the present example, state 430 further comprises unlocking an example torque converter at 434. In additional examples of the control state 430, different processes and controls may be carried out on the powertrain to compensate for torque reduction, as described above in FIG. 3 and below in FIGS. 5 and 6.

If, as states 420 and/or 430 are active, condition D is met, then the control system runs state 410 and all other states are deactivated. Further, if either of conditions A' or B' is met (e.g., a powertrain state such that A||B is present, where the double bar "||" denotes logical disjunction, also known as "logical or"), then the control system runs state 440 and all other states are deactivated.

If either condition A' is met or condition B' is met then the control system begins torque reduction exit control state 440 by initializing a timer at 442. After initialization the timer is incremented to allow time to pass, holding torque reduction at 444, until condition E is met. By holding torque reduction, the control state 440 reduces potential for inadvertent noise identification, or premature termination of torque reduction control state 420. In some examples, however, 442 and 444 may be omitted. After condition E is met, control state 440 may ramp out torque reduction, for example, as was carried out at 426. In further examples, ramping out torque reduction may comprise increasing a rate of raising the torque output limit from the engine, for example in response to a rate of increase in torque output from the engine being above a fast ramp out threshold. In this way, the torque output limit may be raised quickly in response to rapidly improving engine conditions, and thereby enhancing engine performance. In some examples, a fast ramp out threshold is a 24% increase in torque output.

Finally, if the torque reduction exit state 440 continues, condition D may be met, causing the control system to activate state 410 and deactivate state 440. If, however, both conditions A and B are met (e.g., the powertrain is in a state such that A & B are present), the control system reactivates state 420 and deactivates state 440.

FIG. 5 is a flow chart illustrating an example combustion stability limiting (CSL) routine 500 for controlling combustion stability in an example engine, such as carried out by control system 50.

First at 510, routine 500 includes calculating one or more CSL control entry thresholds. CSL control entry thresholds may comprise, for example, the commanded torque threshold, and the manifold pressure threshold described above. Next, at 512, the routine 500 may include determining whether the engine is above the CLS control entry threshold(s). Monitored engine parameters may be compared to the entry thresholds calculated at 510. The determination at 512 may be similar to testing conditions A and B described above with reference to FIG. 4.

If the engine is not determined to be above the CSL control entry threshold(s) at 512, then the routine may end. Alternately, if the engine is determined to be above the CSL control entry threshold(s) at 512, then the routine may continue to 514 to initialize a CLS torque limit. The CLS torque limit may be an example torque output limit as described above with reference to FIG. 4. Next, at 516, the routine includes determining if combustion is sufficiently stable. Such a determination may be made by comparing, for example, spark delta to a torque loss threshold, e.g., testing condition C described with reference to FIG. 4. Further, in a second example, testing if combustion is stable may include comparing the CSL torque limit to a stability threshold, e.g., testing condition D as described with reference to FIG. 4. The second example may occur because process 522 has been already run, and determination 516 is being carried out to determine if process 522 should be repeated.

If combustion is not considered sufficiently stable, the routine 500 may include running CSL torque control at 522. One example of running CSL torque control at 522 is described in FIG. 6 as routine 600. CSL torque control may comprise limiting torque from an engine and/or limiting airflow by comparing a spark delta to threshold values, such as the torque loss threshold, or a torque hysteresis threshold and may further comprise compensating for torque loss. After 522, the routine returns back to determining if combustion is stable at 516.

If combustion is considered stable, the routine 500 may continue to perform noise rejection at 518. Finally, routine 500 may include ramping out the CSL torque limit at 520, before ending. Ramping out the CSL torque limit at 520 may be similar to the process carried out by state 440 at 446 described with reference to FIG. 4.

Referring now to FIG. 6, a flow chart illustrates an additional example routine 600 for controlling combustion stability in an example engine. Routine 600 may be one example approach for the process of 522.

First, at 610, routine 600 determines if a driver is requesting a commanded torque above an example torque output threshold. The engine torque output threshold may be the current engine torque output, or an amount greater than the current engine torque output. Further the engine torque output threshold may be associated with commanded torques, engine pressures/loads and engine speeds lower than those which would nominally cause a downshift or torque converter unlock event. The determination at 610 may be one example of testing if condition A" is met, as described above with reference to FIG. 4. If the commanded torque is above the torque output threshold, the routine 600 continues to 612 to compensate for torque loss. In further examples, compensation is triggered by a parameter other than commanded torque, such as engine load, intake manifold pressure and the like.

In some examples, torque loss compensation may be done automatically without driver intervention. One example of compensation includes adjusting a transmission schedule, such as the torque converter locking/unlocking schedule and/or the transmission gear shift schedule. Further examples of compensation at 612 comprise directly downshifting or unlocking a torque converter.

In additional examples, the compensating process may be only partially automated. For example, as a result of airflow limitation and/or torque reduction for increased combustion stability, the vehicle operator may increase commanded torque. This operator The torque loss compensating may alleviate knock-related engine operating conditions. For example, after a downshift or unlocking of the transmission, a net torque output from the engine may increase, engine speed may decrease, and engine pressure and manifold pressure may decrease—all leading to engine operating conditions that may inhibit knocking. Once compensation has occurred, the routine continues to 614. In the present example, if the commanded torque is not above the torque output threshold, then the routine skips 612 and continues on to 614.

At 614, the routine 600 includes determining if torque loss is below a torque loss threshold. Determination 614 may be the same as testing condition C, as described in FIG. 4. Torque loss is below a torque loss threshold, the routine may continue to 616 to ramp in torque reduction. Ramping in torque reduction may comprise decrementing the SCL torque limit. In some examples, airflow may be controlled by one of a throttle, intake valve, or boost device according to the SCL limiting airflow. Thus ramping in the SCL torque limit may limit airflow to the engine and decrease engine torque. After 616, the routine may end.

If the routine 600 determines that torque loss is above a torque loss threshold at 614, then the routine 600 may continue to determine if the torque loss is above a torque hysteresis threshold at 618. Determination 618 may be the same as testing the truth of condition C', as described in FIG. 4. If the torque loss is above the torque hysteresis threshold the routine may continue to 620 to ramp out torque reduction. Ramping out torque reduction may comprise incrementing the SCL torque limit. In some examples, airflow may be controlled by one of the throttle, intake valve, or boost device according to the SCL limiting airflow, in a manner similar to that described at 616. Thus ramping out the SCL torque limit may reverse limiting of airflow to the engine and increase engine torque. After 620, the routine may end.

Finally, if the torque loss is not above the torque hysteresis threshold, the routine may continue to 622 and maintain the current level of torque loss. For example maintaining torque loss may include holding the value of the CSL torque limit constant. After 622, the routine may end.

FIG. 7 is a timing chart illustrating the effects of the example routines described in FIGS. 5 and 6 on an example powertrain including an engine, during knock control and spark retard. The timing chart includes curve 702, showing an example measurement of relative torque (i.e., spark delta), curve 704, showing an example measurement of throttle position across the same time span, and curve 706, which is a further throttle position given as a contrasting example to curve 704.

In a first time regime, between times T0 and T1, the operation of the example powertrain includes a relative torque above the torque loss threshold and a throttle position more open than closed. At time T1, the relative torque drops below the torque loss threshold. In a second time regime, between times T1 and T2, the throttle position is shown rapidly decreasing, limiting airflow to the engine and thus also limiting torque. Ramping in torque and airflow limitation results in the relative torque shown in the second time regime, which is below the torque loss threshold.

At time T2, the relative torque is shown returning to the torque loss threshold. In response to the relative torque being above the torque loss threshold but below the torque hysteresis threshold, curve 704 is shown maintaining the throttle position achieved at time T2 in a third time regime between time T2 and T3. Alternately, in the third time regime, curve 706 shows a throttle position control that rapidly returns to be being open. An engine controlled according to the throttle position depicted by curve 706 may cause rapid pressure rise in the engine, contributing to NVH issues and degrading engine performance. However, an engine controlled according to the throttle position depicted by curve 704 may reduce such issues.

At time t3, the relative torque is shown to be at the torque hysteresis threshold. Accordingly, during a fourth time regime between time T3 and T4, throttle position depicted in curve 704 is opened to increase torque and airflow. At time T4, curve 702 shows relative torque decreasing below the torque hysteresis threshold, and during the fifth time regime between t4 and T5, throttle position is maintained. Finally, after time T5, throttle position increases, as well as relative torque during ramp out of airflow and torque limiting. The routines may end as a result of torque output increasing above a torque output threshold or the torque output limit being incremented above the stability threshold.

Via the above-described techniques vehicles configured to suppress knock via spark timing retard and airflow limiting can provide improved knock abatement and reduced impact on vehicle performance. By ramping out and ramping in torque limiting and/or airflow control, the methods, routines and controls described herein address the issues associated with controlling combustion instability during such knock control. Further, by compensating for the torque loss (due to the spark retard and airflow limiting) via torque converter adjustment and/or transmission gear ratio adjustment, vehicle responsiveness during airflow limiting knock control is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling an engine driving a transmission, comprising:
    limiting airflow to the engine in response to a spark timing retarded beyond a spark retard threshold, the limiting airflow to the engine reducing engine torque output; and
    compensating for the reduction in engine torque output by adjusting a transmission operating parameter including one or more of unlocking a transmission torque converter or downshifting from a higher gear to a lower gear in the transmission.

2. The method of claim 1, wherein limiting the airflow to the engine comprises closing a throttle value upstream of the engine, and where the unlocking of the transmission torque converter or downshifting of the transmission is performed in response to a further depression of an operator accelerator pedal.

3. The method of claim 1, wherein an engine cylinder includes an intake valve, the intake valve actuatable between an open position and a closed position, and wherein limiting the airflow to the engine comprises at least one of decreasing intake valve open duration, decreasing intake valve lift, advancing intake valve timing, and retarding intake valve timing.

4. The method of claim 1, wherein a boost device comprising a compressor is coupled upstream of the engine, increasing a mass of air entering the engine, and wherein limiting the airflow to the engine comprises reducing boost from the compressor.

5. A method for controlling an engine driving a transmission, comprising:
- limiting airflow to the engine in response to a spark timing retarded beyond a spark retard threshold, the limiting airflow to the engine reducing engine torque output;
- compensating for the reduction in engine torque output by adjusting a transmission operating parameter; and
- ramping in the limiting of airflow to the engine during the compensation for the reduction in engine torque output.

6. The method of claim 1, wherein the unlocking of the transmission torque converter or downshifting of the transmission is performed in response to an adjustment of a torque converter lock/unlock schedule or a transmission gear shift schedule, respectively.

7. A method for controlling an engine coupled in a powertrain of a vehicle, the method comprising:
- retarding spark timing in response to knock, the spark timing retarded up to a spark retard threshold, the spark retard threshold set based on a relative torque reduction due to the retarded spark timing;
- further reducing torque when the spark timing is retarded to the spark retard threshold, the torque further reduced by ramping in limiting of airflow to the engine after the spark timing reaches the spark retard threshold, the airflow being limited by reducing boosting of intake air; and
- ramping out the limiting, of the airflow in response to an increase in a relative engine torque output.

8. The method of claim 7 wherein the spark retard threshold is set based on a relative torque reduction due to the retarded spark timing that may result in combustion instability.

9. The method of claim 7 wherein the relative torque reduction is a ratio of torque at a current spark retard from MBT timing to torque at MBT timing for current operating conditions.

10. The method of claim 7, wherein the spark retard threshold is adjusted with an intake manifold air pressure (MAP).

11. The method of claim 7, wherein the spark retard threshold is adjusted with a commanded torque.

12. The method of claim 7, further comprising compensating for the ramping in of the limiting of airflow by adjusting a transmission operating parameter.

13. The method of claim 12, wherein the adjusting a transmission operating parameter includes adjusting a transmission gear shift schedule.

14. The method of claim 12, wherein the adjusting a transmission operating parameter includes adjusting a torque converter lock/unlock schedule.

15. The method of claim 8, wherein airflow limit is ramped out at a different rate than it is ramped in.

* * * * *